United States Patent
Morrison et al.

[11] Patent Number: 5,932,948
[45] Date of Patent: Aug. 3, 1999

[54] ROTOR V-BLOCK ASSEMBLY

[75] Inventors: Darrell Morrison, Mankato; Craig Peterson, North Mankato, both of Minn.

[73] Assignee: Caterpillar Inc., Peoria, Ill.

[21] Appl. No.: 09/158,368

[22] Filed: Sep. 22, 1998

[51] Int. Cl.$^6$ ........................................... H02K 3/48
[52] U.S. Cl. ............................................... 310/214
[58] Field of Search ................................. 310/214, 218, 310/261, 216, 58, 65, 201

[56] References Cited

U.S. PATENT DOCUMENTS

| | | | |
|---|---|---|---|
| 2,899,573 | 8/1959 | Wesolowski | 310/214 |
| 2,990,486 | 6/1961 | Willyoung | 310/214 |
| 3,008,786 | 11/1961 | Costello | 310/214 |
| 3,766,417 | 10/1973 | Hallenbeck | 310/214 |
| 4,068,142 | 1/1978 | Gillet et al. | 310/214 |
| 5,036,238 | 7/1991 | Tajima | 310/214 |

*Primary Examiner*—Nestor Ramirez
*Assistant Examiner*—Dang Dinh Le
*Attorney, Agent, or Firm*—Alan J. Hickman

[57] ABSTRACT

A V-block assembly for an electrical machine having a rotor with a spider and poles disposed in a circular array around the spider and conductive windings encircling the poles comprising a dovetail groove in the spider between adjacent poles and a plurality of V-blocks each comprising a pair of flat bars having one end abutting, the abutting end being formed to fit the dovetail, the flat bars being bent outwardly to form a V and a jack screw fastened between the flat bars adjacent the open end to press the bars against the windings of adjacent poles to prevent the windings from moving laterally and radially outward as the rotor rotates.

10 Claims, 5 Drawing Sheets

Fig_2_

Fig_3.

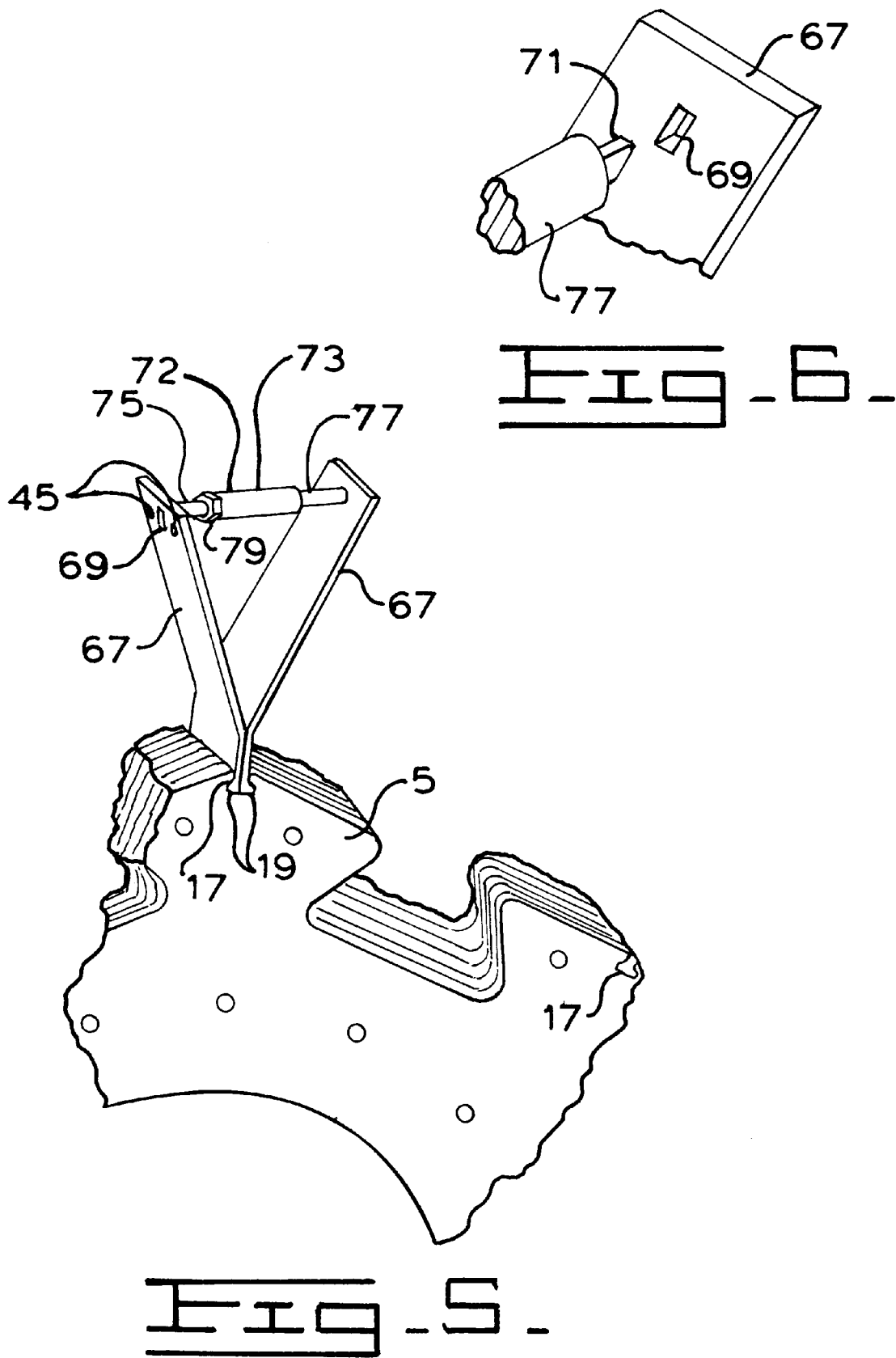
Fig_6_
Fig_5_

ROTOR V-BLOCK ASSEMBLY

TECHNICAL FIELD

The invention relates to an electric machine and more particularly to a rotor for an electric generator.

BACKGROUND ART

Current manufacturing procedures for electrical rotating machinery salient pole rotors use a V shaped block radially bolted to a rotor spider. These V-blocks are formed from a flat bar bent to from a V and have a bar across the distal ends of the V and welded thereto to provide a tangential restraint. The spider and V block each have two registering holes for bolting the V-block to the spider. Laminated rotors require a weld bead surrounding the holes so that the holes can be tapped. There are generally 3 to 7 V-blocks disposed axially along the length of the machines and the number of poles generally range from 4 to 8. Thus, the number of drilled welded and tapped holes generally range from 24 to 112 per rotor. The heads of the bolts also create ventilation blockage for axial air flow between the poles.

DISCLOSURE OF THE INVENTION

Among the objects of this invention may be noted the provision of a V-block assembly which is easily installed and compensates for variations in the distance between adjacent pole windings.

In general, a V-block assembly for an electrical machine has a rotor with a spider and poles disposed in a circular array around the spider and conductive windings encircling the poles. When made in accordance with this invention, the V-block assembly comprises a pair of flat bars abutting on one end and bent outwardly adjacent the abutting end to form an open end V. The abutting ends are generally shaped to form a dovetail. Generally dovetail shaped grooves are disposed in the spider portion of the rotor between adjacent poles. The dovetail shaped end of the flat bars fit in the generally dovetail shaped grooves in the spider. A jack screw is disposed in the open end of the V to force the flat bars against the windings of adjacent poles to prevent the windings from moving laterally and radially outward as the rotor rotates.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 5 is an isometric view of a portion of a rotor showing an alternative embodiment of this invention; and FIG. 6 is a partial isometric exploded view of a portion of a jack bolt and distal end of a flat bar forming half of the V-block.

BEST MODE FOR CARRYING OUT THE INVENTION

Figure 1:
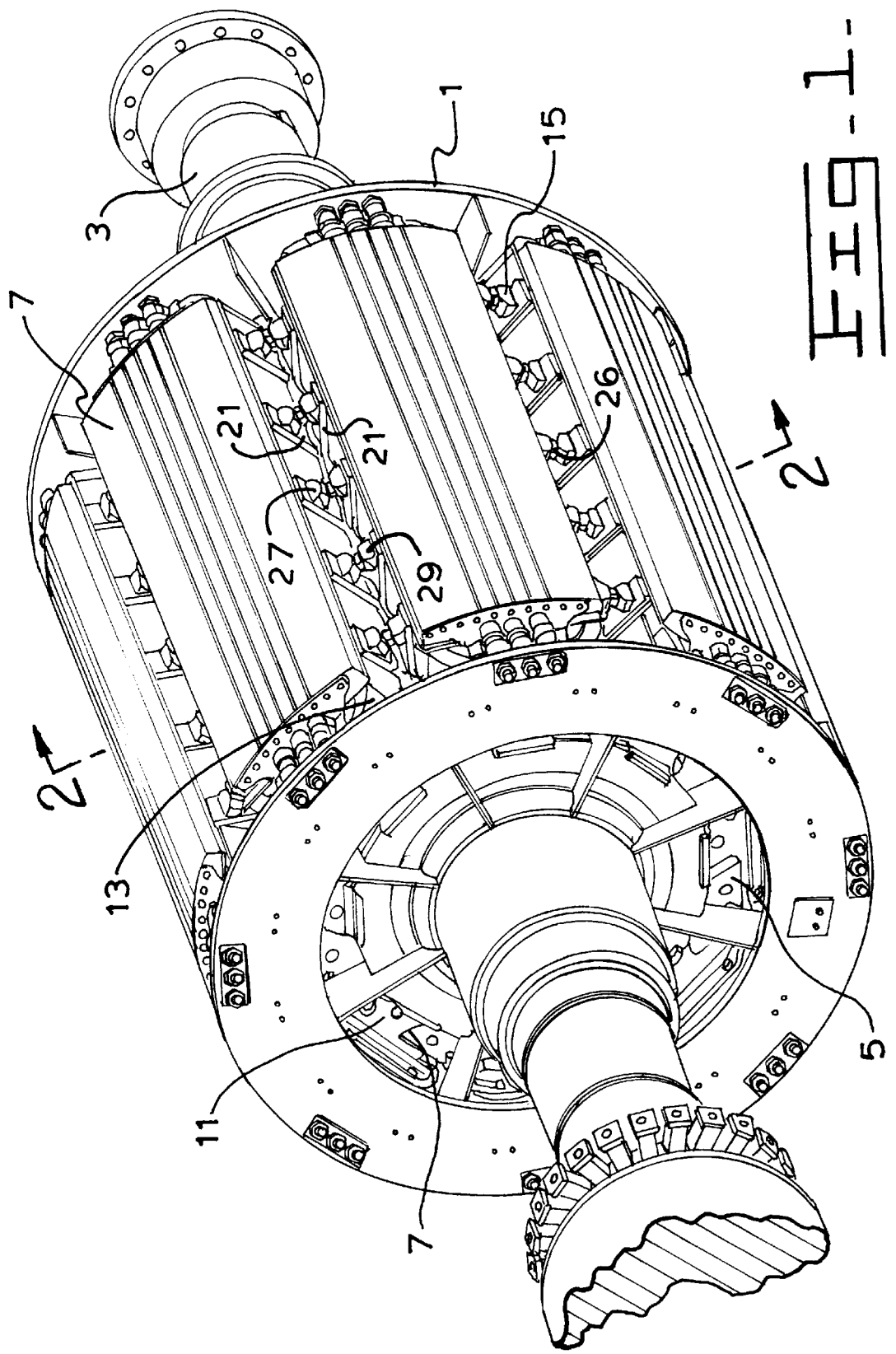
FIG. 1 is an isometric view of a rotor with V-blocks made in accordance with this invention.

Referring now to FIG. 1 there is shown a rotor 1 for an electrical machine such as a generator or motor. The rotor 1 comprises a shaft 3 having a stack of laminated spider plates 5 attached thereto. A circumferential array of rotor poles 7 formed from laminated plates are attached to the laminated spider plates 5.

Figure 2:
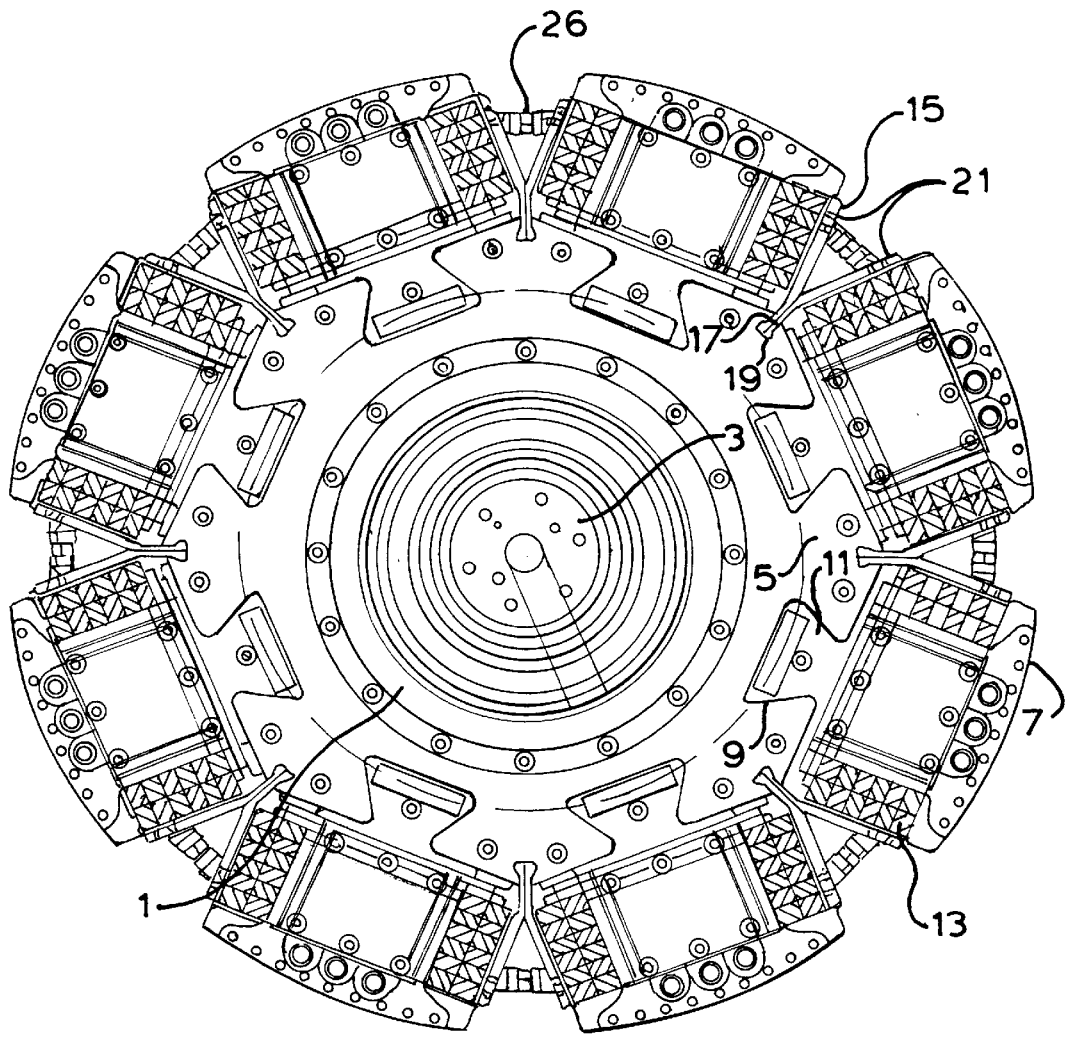
FIG. 2 is a sectional view taken on line 2—2 of FIG. 1.

Referring now to FIG. 1 and 2, the spider plates 5 have a plurality of generally dovetail shaped or similar functioning notches 9, which register to form longitudinal grooves to receive generally dovetail shaped portions 11 formed on the inner end of the laminated plates that form the rotor poles 7. Insulated copper pole windings 13 encircle the poles 7, and are held in place by V-blocks 15, which restrain lateral and radial movement due to the centrifugal and lateral forces created by the rotating rotor 1. The spider plates 5 also have a plurality of generally dovetail shaped or similarly functioning notches 17 that register to form longitudinal grooves to receive generally dovetail shaped portions 19 disposed adjacent the vertex of the V-blocks 15.

Figure 3:
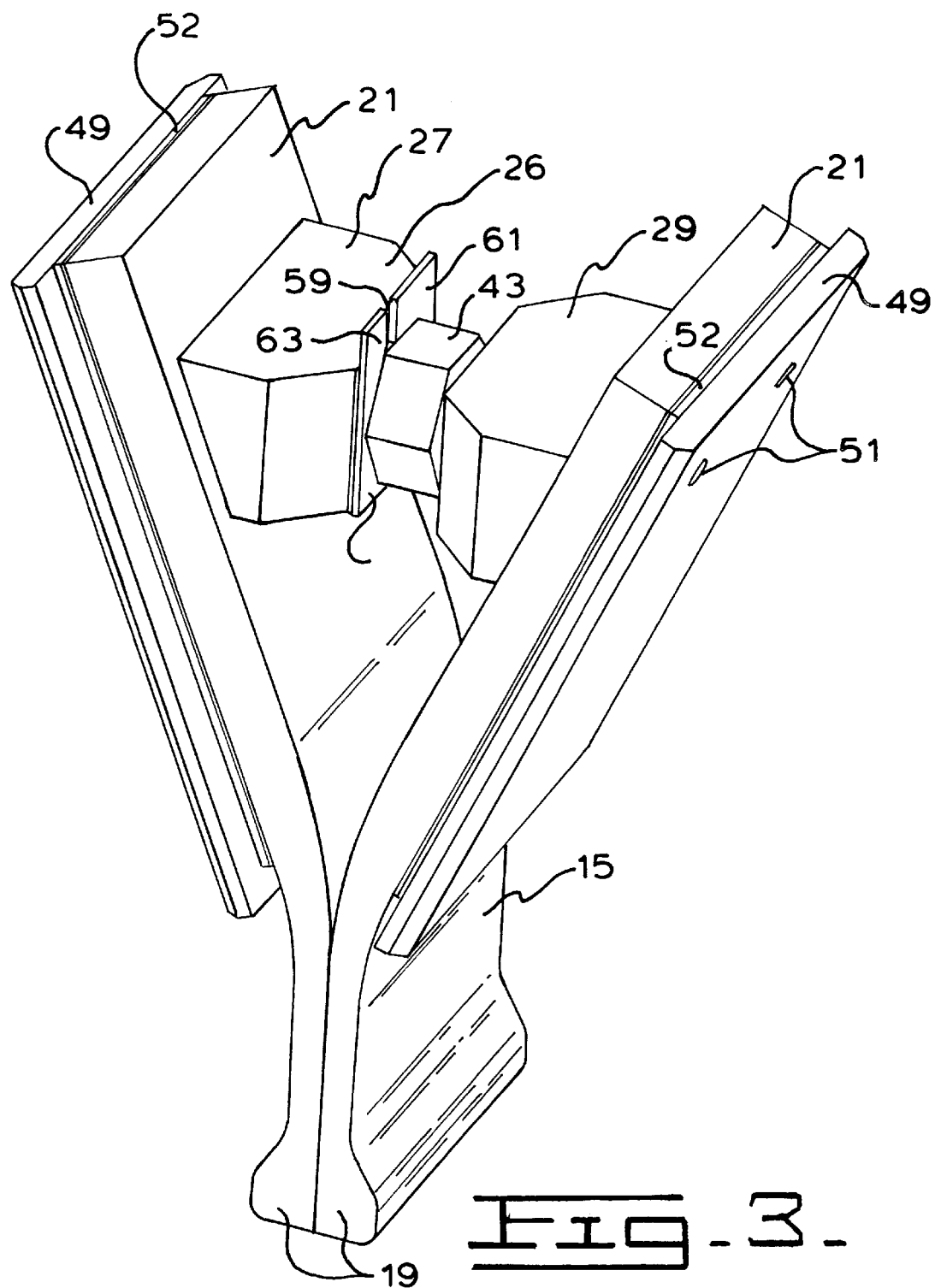
FIG. 3 is an isometric view of a V-block made in accordance with this invention.
Figure 4:
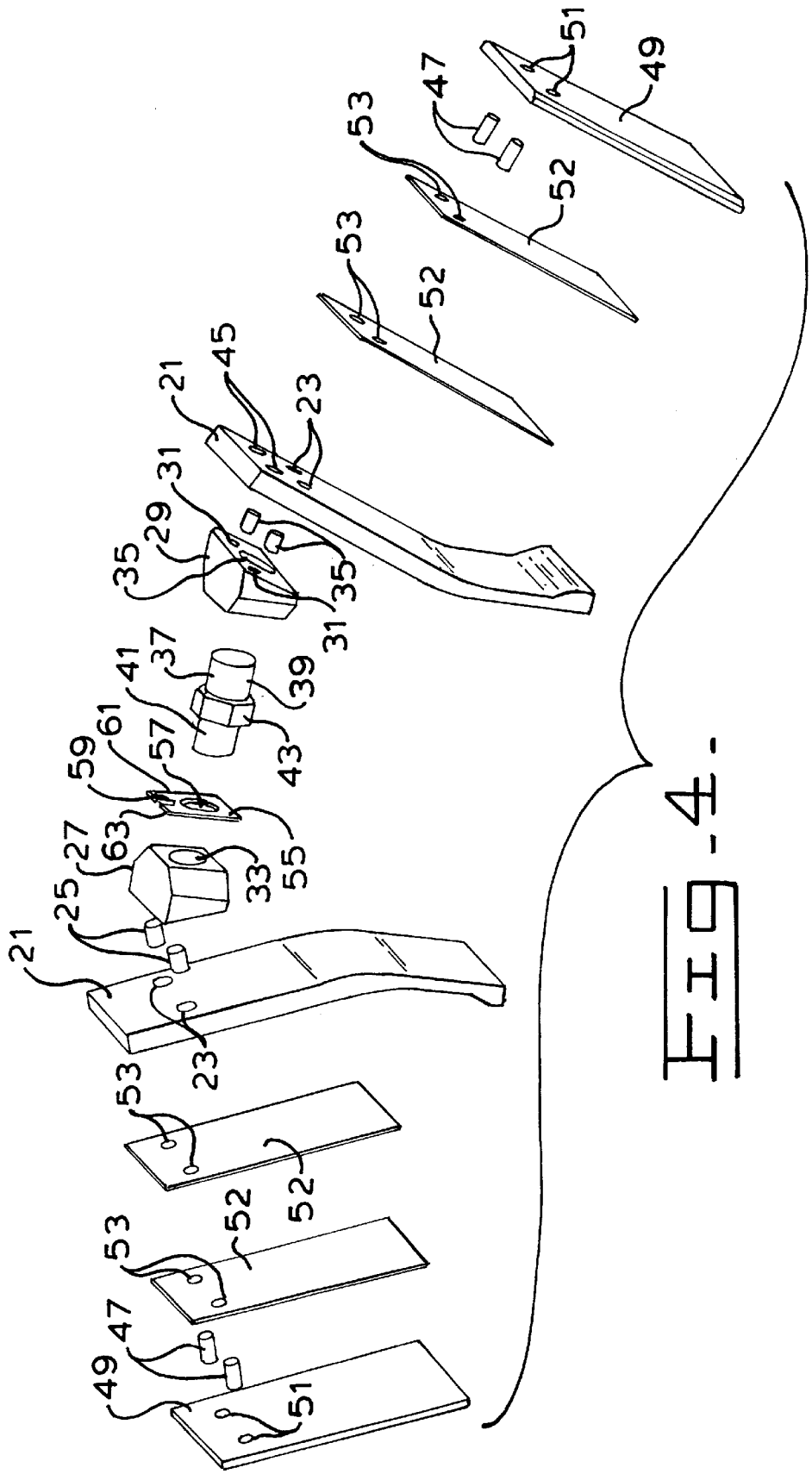
FIG. 4 is an exploded isometric view of the v-block shown in FIG. 3.

Referring now to FIGS. 3 and 4 the V-blocks 15 comprises two flat bars 21, preferably made of aluminum. The flat bars 21 abut on one end and are machined to form the generally dovetail shaped portion 19. The flat bars 21 are bent adjacent the dovetail portion 19 so as to diverge and form a V. A pair of holes 23 are disposed adjacent the distal or open end of the flat bars 21 to receive round pins 25, preferably made of nonmagnetic stainless steel. A jack screw assembly or jack screw 26 comprises a pair of blocks 27 and 29, preferably made of aluminum. Each block 27 or 27 has a pair of blind holes 31, which register with the holes 23 in the adjacent flat bar 21 and is fastened to the adjacent flat bar 21 by the pins 25. One of the blocks 27 has a smooth through hole 33 and the other block 29 has a through hole 35 that is threaded. A jack bolt 37, preferably made of aluminum, has a threaded portion 39 on one end and has a round smooth portion 41 on the other end. A hexagon portion 43 is disposed between the end portions 39 and 41. The flat bars 21 also have a pair of blind round holes 45 disposed on the outer side adjacent the distal end to receive pins 47 preferably made of fiberglass. Strips of insulating material 49, such as fiberglass fit between the flat bars 21 and pole windings 13. The insulating strips 49 have round holes 51 that register with the blind holes 45 in the flat bars 21 and fit over the pins 47 made of fiberglass or other insulating material to hold the insulating strips 49 in place. Shims 52, preferably made of aluminum, fit between the strips of insulating material 49 and the flat bars 21 and have holes 53 which register with the holes 45 and fit over the pins 47 to hold the shims 52 in place. The shims 52 are utilized to provide a close fit between the V-Blocks 15 and the pole windings 13 so that the jack screw 26 is only jacked a small amount. A lock tab 55, preferably made of a non magnetic rectangular shaped sheet of stainless steel, has a round hole 57, which fits over the round bar portion 41 of the jack bolt 37. A slit 59 extending from one side of the lock tab 55 forming two tabs 61 and 63. One of the tabs 61 or 63 can be bent over the hexagonal portion 43 of the jack bolt 37. The other tab 63 or 61 can be bent over the block 27 to prevent the jack bolt 37 from turning once it is tightened to press the V-blocks against adjacent pole windings 13.

Referring now to FIG. 5 & 6 there is shown an alternative V-block assembly comprising a pair of flat bars 67 which are essentially the same as flat bars 21 with one exception. In place of the pair of holes 23 in the flat bars 21 there is a single hole 69 which is rectangular or any other shape which will prevent a registering tenon 71 from turning when fitted into the hole 69. The V-block assembly 65 further comprises a jack screw assembly or jack screw 72. The jack screw 72 comprises a central jack bolt portion 73 with a right hand thread on one end and a left hand thread on the other end. A first jack bolt end portion 75 with a right hand thread that fits the right hand thread of the central portion 73. A second jack bolt end portion 77 with a left hand thread that fits the left hand thread of the central portion 73. The tenon 71 is disposed on the outboard end of each jack bolt end portion 75 and 77. A lock nut 79 is disposed on one of the end portions, preferably the first end portion 75 as it has a right hand thread. The lock nut 79 prevents the center jack bolt portion 73 from turning once the center jack bolt portion 73 is turned to press the V-block 65 against the pole windings 13 of adjacent poles 7. The insulating strips 49 and shims 52 (not shown in this Figure) fasten to the flat bars 67 utilizing the pair of holes 45 in the same manner as they are utilized on the flat bars 21.

The V-blocks 15 and 65 are made on nonmagnetic material to reduce eddy currents and improve electrical efficiency of the machine.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

A rotor V-block assembly for an electrical machine having a rotor with a spider and poles disposed in a circular array around the spider and conductive windings encircling the poles when made in accordance with this invention, advantageously provides a plurality of V-blocks for supporting the pole windings so as to prevent lateral and radial creep as the rotor rotates. The assembly takes less time to install and is less costly as no welding is required. The ventilation adjacent the pole windings is improved making the rotor run cooler and extending it life. The V-blocks are individually adjustable to compensate for variations in the distance between adjacent pole windings along their length.

I claim:

1. V-block assembly for an electrical machine having a rotor with a spider and poles disposed in a circular array around the spider and conductive windings encircling the poles; the V-block assembly comprising a pair of flat bars abutting on one end and being bent outwardly adjacent the abutting end to form an open end V, the abutting ends being generally shaped to form a dovetail, generally dovetail shaped grooves being disposed in the spider portion of the rotor between adjacent poles, the dovetail shaped end of the flat bars fitting in the generally dovetail shaped grooves in the spider and a jack screw being disposed in the open end of the V to force the flat bars against the windings of adjacent poles to prevent the windings from moving laterally and radially outward as the rotor rotates.

2. The V-block assembly as set forth in claim 1, wherein there are a plurality of V-blocks in each dovetail groove.

3. The V-block assembly as set forth in claim 2, wherein the jack screw comprises a block fastened to each flat bar adjacent the open end, one of the blocks having a smooth hole disposed therein and the other block having a threaded hole disposed therein and a bolt having a thread which fits the threaded hole on one end and a round portion which fits in the smooth hole on the other end and a hexagonal portion between the end portions, whereby the bolt can be turned to force the flat bars against the windings.

4. The V-block assembly as set forth in claim 3, wherein the screw jack comprises a lock tab generally rectangular in shaped with a hole that fits the round portion of the bolt and having a slot extending from one edge forming two tabs, one of which is bent over the hexagon portion of the bolt and the other is bent over the block to prevent the bolt from turning after it has been tightened.

5. The V-block assembly as set forth in claim 4, wherein the jack screw further comprises a pair of holes in each of the blocks, a pair of registering holes in each of the flat plates and a pin which fits into each of the registering holes to fasten the blocks to the flat bars.

6. The V-block assembly as set forth in claim 5, wherein the pairs of holes in the blocks are blind holes whereby the pins are captured in the holes and can not be thrown out as the rotor rotates.

7. The V-block assembly as set forth in claim 2, wherein the jackscrew comprises a center portion which has a right hand thread on one end and a left hand thread on the other end, one end portion having a right handed thread that mates with the right hand thread of the center portion and an other end portion having a left hand thread that mates with the left handed thread of the center portion, each end portion having a tenon and each of the flat bars having an opening which fits the tenon in such a manner to prevent the end portions from turning and a lock nut fitting one of the end portions and engage the center portion to prevent the center portion from turning once the jack screw has been tightened.

8. The V-block assembly as set forth in claim 3, further comprising and insulating strip disposed between each flat plate and the pole windings and fastened to the flat bars by insulated fasteners.

9. The V-block assembly as set forth in claim 8, further comprising shims disposed between the insulating strips and the flat bars to minimize the amount of tightening required to be applied by the jack screw.

10. The V-block assembly as set forth in claim 5, wherein the tenons on the end portions and the openings in the flat bars are generally rectangular in shape.

* * * * *